(12) United States Patent
Quarre et al.

(10) Patent No.: US 7,705,323 B2
(45) Date of Patent: Apr. 27, 2010

(54) MICROSCOPE STAGE WITH FLEXURAL AXIS

(75) Inventors: Steven C. Quarre, Woodinville, WA (US); John Malcolm, Bellevue, WA (US)

(73) Assignee: Applied Precision, Inc., Issaquah, WA (US)

( * ) Notice: Subject to any disclaimer, the term of this patent is extended or adjusted under 35 U.S.C. 154(b) by 683 days.

(21) Appl. No.: 11/400,058

(22) Filed: Apr. 7, 2006

(65) Prior Publication Data

US 2006/0289783 A1     Dec. 28, 2006

Related U.S. Application Data

(60) Provisional application No. 60/669,821, filed on Apr. 8, 2005.

(51) Int. Cl.
*G21K 5/10*     (2006.01)
(52) U.S. Cl. .............................. 250/440.11; 250/442.11; 442/110

(58) Field of Classification Search ............ 250/440.11, 250/442.11; 442/110
See application file for complete search history.

(56) References Cited

U.S. PATENT DOCUMENTS

| | | | |
|---|---|---|---|
| 2,909,099 A | | 10/1959 | Hansen |
| 3,407,018 A | | 10/1968 | Miller |
| 5,165,297 A | * | 11/1992 | Krueger .................... 74/479.01 |
| 5,689,063 A | * | 11/1997 | Fujiu et al. ..................... 73/105 |
| 6,137,627 A | | 10/2000 | Engelhardt et al. |
| 6,278,113 B1 | * | 8/2001 | Murayama et al. .......... 250/306 |
| 6,346,710 B1 | * | 2/2002 | Ue ......................... 250/442.11 |

FOREIGN PATENT DOCUMENTS

GB         1 245 455 A       9/1971

* cited by examiner

*Primary Examiner*—David A. Vanore
*Assistant Examiner*—Phillip A. Johnston

(57) ABSTRACT

A microscope stage with a flexural axis may exhibit predictable flexure characteristics and limited cross-coupling translations. Z motion of a Z plate proximate to a Z actuator may be substantially linear, while a distal side of the Z plate may be allowed to rotate about a hinge axis associated with a flexural component.

27 Claims, 10 Drawing Sheets

Flexural Stage, 150 μm Z scan

DV4 Production Stage, 150 μm Z scan

Engineering Stage, 150 μm Z scan

Flexural Stage, Z = -200 μm

Flexural Stage, Z = 0
(horizontal plate)

Flexural Stage, Z = +200 μm

MICROSCOPE STAGE WITH FLEXURAL AXIS

CROSS-REFERENCE TO RELATED APPLICATIONS

This application claims the benefit of U.S. Provisional Application Ser. No. 60/669,821 entitled "MICROSCOPE STAGE WITH FLEXURAL AXIS," filed Apr. 8, 2005, the disclosure of which is hereby incorporated by reference in its entirety.

FIELD OF THE INVENTION

Aspects of the present invention relate generally to stages, and more particularly to a microscope stage exhibiting predictable Z translation characteristics and limited cross-coupling translations.

BACKGROUND

Microscope stages are generally required to be highly accurate and repeatable along all motion axes. Typically, a microscope stage will have three orthogonal axes: X, Y, and Z, which are generally defined by the optical axis of the microscope. For most applications, motion along the Z axis should be characterized by high resolution, for example step distances of less than about 0.10 µm, and high repeatability, for example error between multiple visits to the same targeted Z location of less than about 0.20 µm. Additionally, microscopy systems generally attempt to minimize cross-coupling between motion in the Z and X and Y coordinate axes, since such cross-coupling tends to distort the data captured during imaging operations, which in turn decreases quality and usability of the data acquired. A typical Z scan of a microscope slide may consist of 65 points taken on 0.20 µm intervals, for a total Z axis displacement of 13 µm. Ideally, cross-coupling movement in the X or Y axes in such applications would be limited to about 0.40 µm or less throughout the total 13 µm Z scan.

In accordance with conventional stage technologies, as exemplified in the assignee's U.S. Pat. Nos. 6,781,753 and 5,812,310, the disclosures of which are hereby incorporated by reference in their entirety, a conventional microscopy system stage utilizes a series of linear slides in a ramp configuration. The slides and ramp cooperate to guide a microscope slide, disposed on the stage, in the Z dimension. Such multiple linear slide configurations required to create a Z translation, by necessity, are over-constrained. Consequently, parts tolerance, specifications, and assembly methods must be extremely accurate, otherwise the slides will "fight" each other during motion. This can cause binding along the Z axis, which results in high repeatability errors.

Additionally, conventional systems are typically associated with attendant high costs, which result from the foregoing specification, tolerance, and assembly requirements. For example, six separate linear slides and multiple custom machined plates or slide mounts may be required in order to enable Z axis translation in a conventional system.

SUMMARY

Embodiments of the present invention overcome the above-mentioned and various other shortcomings of conventional technologies. The present invention provides a microscope stage exhibiting predictable Z translation characteristics, limited cross-coupling translations, high repeatability, and greater simplicity.

The foregoing and other aspects of various embodiments will be apparent upon examination of the following detailed description thereof in conjunction with the accompanying drawing figures.

DETAILED DESCRIPTION

A microscopy stage configured and operative in accordance with certain embodiments of the present invention may utilize a flexural design for Z axis motion or translation; in such an exemplary embodiment, a single Z plate may be pivotally mounted such that it is allowed to pivot on one or more flexural components at one end, while the other end may be translated in the Z dimension substantially parallel to the Z axis. It will be appreciated that, especially for small Z translations, cross-coupling in one axis perpendicular to the Z rotation axis, termed the X axis, may be negligible. In some applications, for example, a 13 µm Z scan may result in cross-coupling translations of only approximately 0.013 µm in X. This is a theoretical value based, in part, upon stage geometry; in some practical applications, expected cross-coupling translations along both X and Y axes may typically be greater due to other stage effects.

The use of flexural components to translate in the Z dimension can greatly simplify microscope stage design and may reduce assembly time and component cost. The six linear slides and supporting structures currently employed in traditional Z translation implementations may be omitted in certain embodiments of the present invention.

Figure 1:
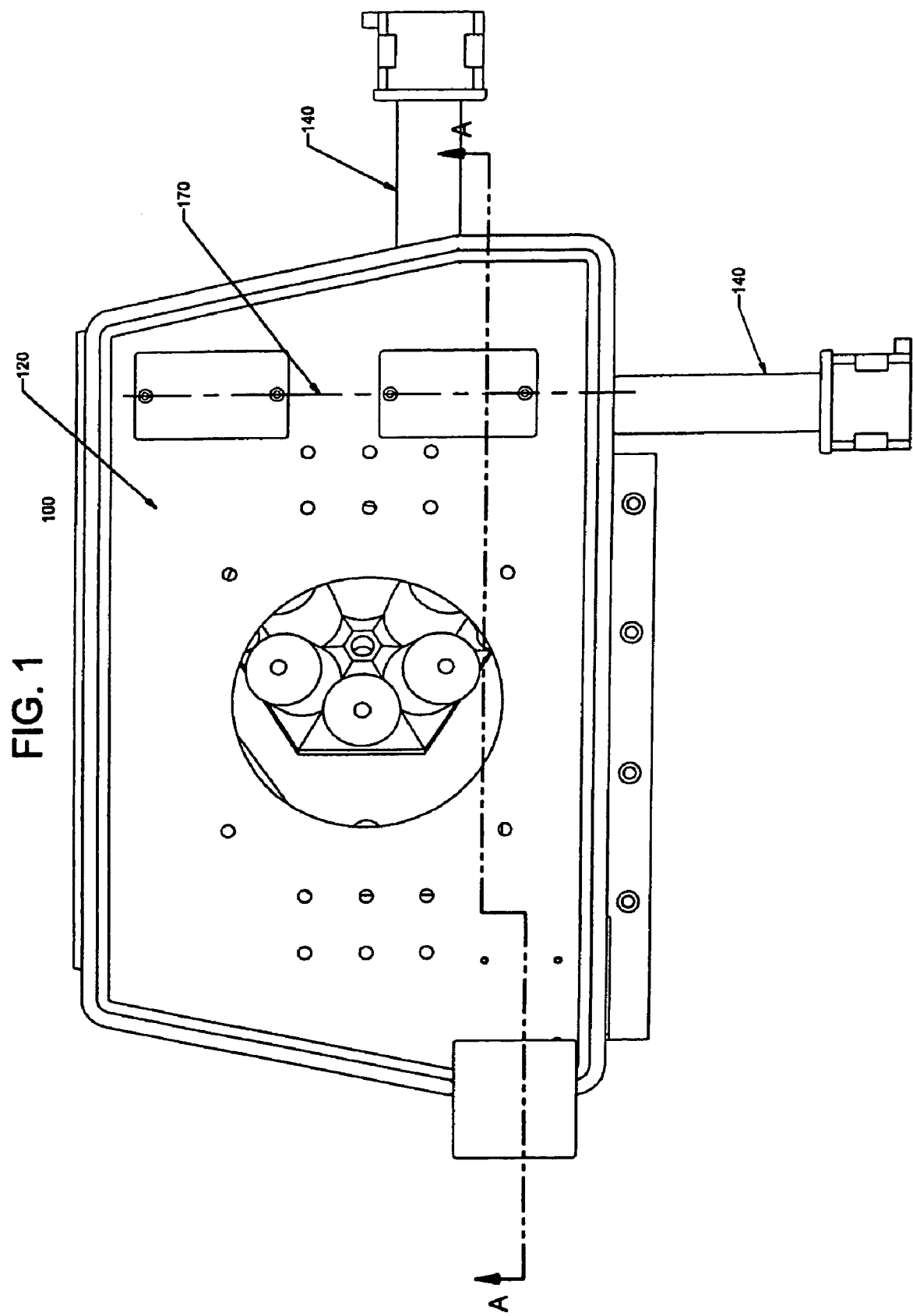
FIG. 1 is a simplified plan view of one embodiment of a microscope stage exhibiting predictable Z translation characteristics and limited cross-coupling translations.
Figure 2:
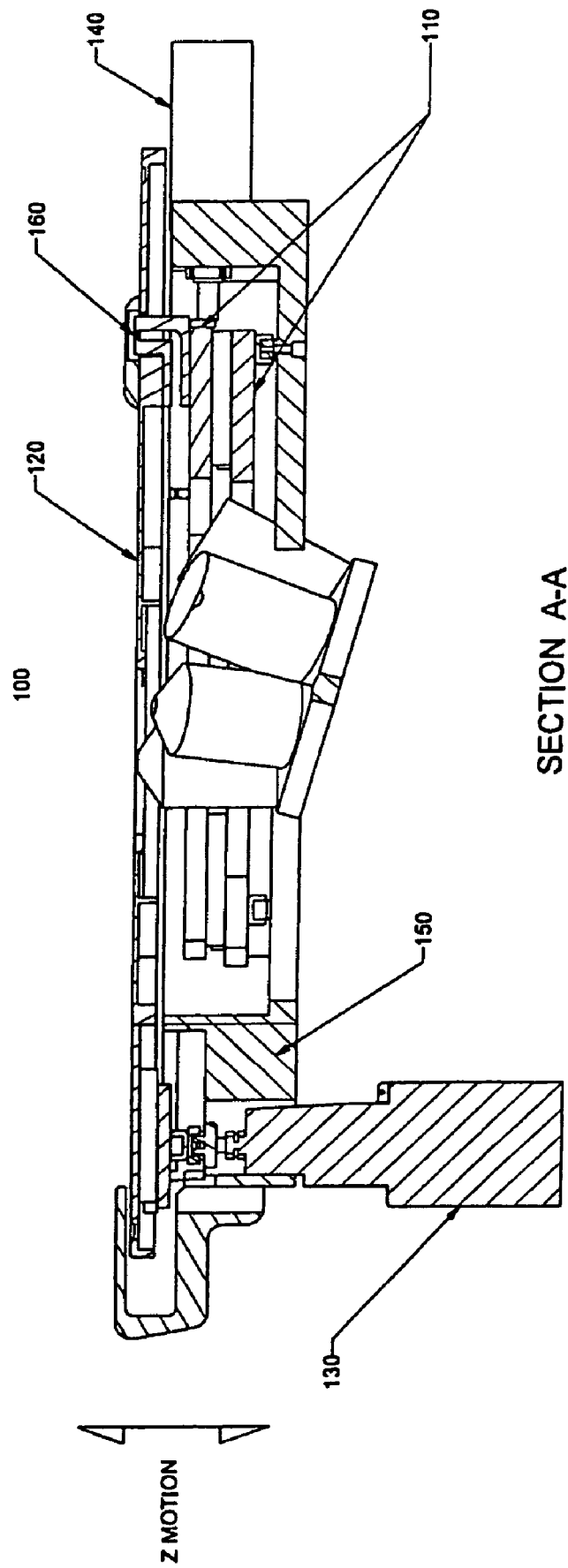
FIG. 2 is a simplified cross-sectional view of one embodiment of a microscope stage exhibiting predictable Z translation characteristics and limited cross-coupling translations.
Figure 3:
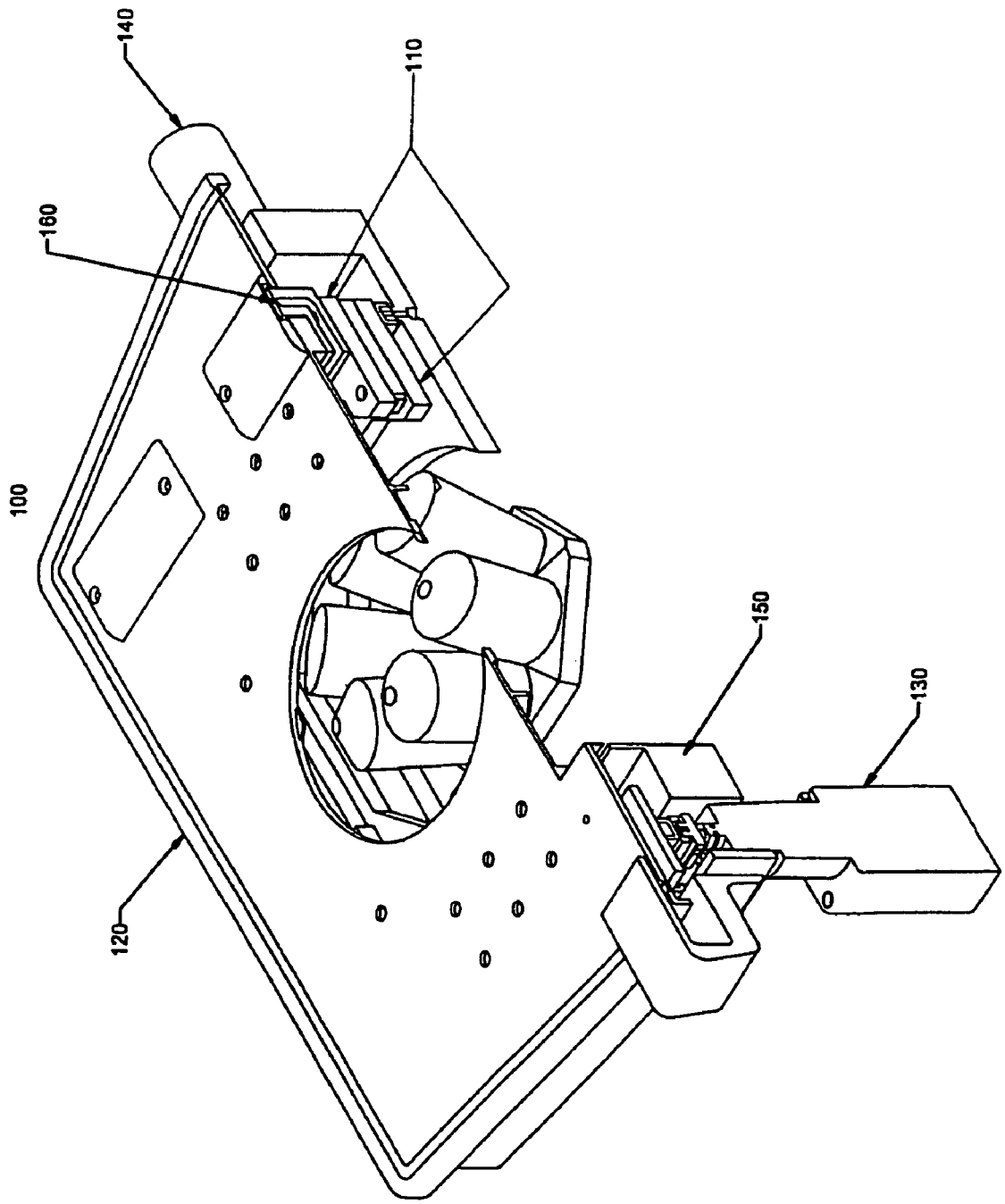
FIG. 3 is a simplified cross-section view of one embodiment of a microscope stage exhibiting predictable Z translation characteristics and limited cross-coupling translation.
Figure 4:
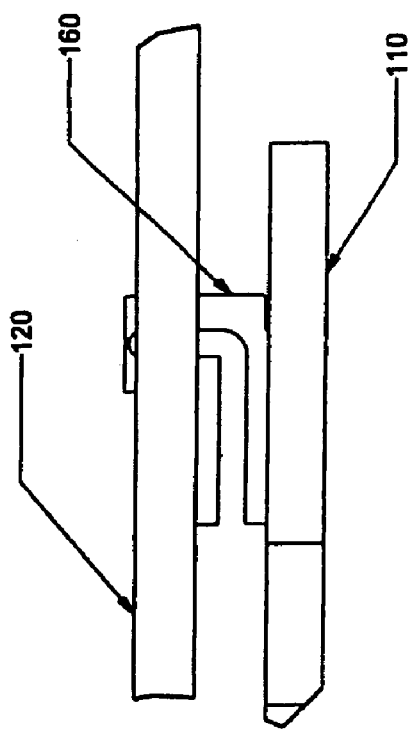
FIG. 4 is a detailed cross-sectional view of the microscope stage and flexural component illustrated in FIG. 2.
Figure 5:
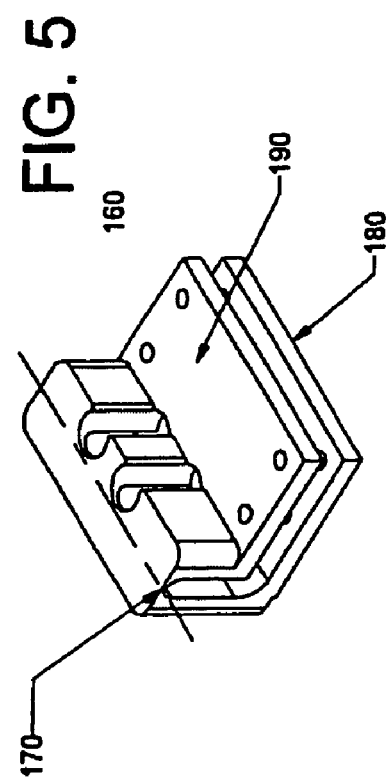
FIG. 5 is a perspective view of one embodiment of a flexural component.

Turning now to the drawing figures, FIG. 1 is a simplified plan view, and FIGS. 2 and 3 are simplified cross-sectional views, of one exemplary embodiment of a microscope stage exhibiting predictable Z translation characteristics and limited cross-coupling translations. FIG. 4 is a detailed cross-sectional view of the microscope stage and one embodiment of a flexural component as illustrated in FIGS. 2-3. FIG. 5 is a perspective view of one embodiment of a flexural component.

In accordance with the implementation depicted in FIGS. 1-3, an exemplary microscope stage 100 may include X-Y translation table base 110, Z plate 120, Z actuator 130, X and Y actuators 140, stage frame 150, and one or more flexural components 160. Actuators, such as for example, Z actuator 130 or X and Y actuators 140 may comprise manual, mechanical, electrical, electromechanical, or other devices or components to effect movement. Flexural components, such as flexural component 160, may comprise devices or components effecting rotation about a hinge axis. It will be appreciated that a typical microscopy system may include additional elements such as, for example, a metrology frame (not shown) to which various of the depicted elements may be fixedly or movably attached. Common elements of conventional microscopy systems such as, for example, optics, imaging and data acquisition apparatus, electrical or electronic control systems, and associated microscope stage components have been omitted from the drawing figures for clarity.

It will be appreciated that a Z actuator 130 may be disposed on the side of the microscope stage 100 opposite the flexural components 160. For many applications, Z actuator 130 may be embodied in or comprise either a stepper or direct current (DC) motor-driven lead screw device, for example a piezoelectric actuator mechanism, a bellows coupling driven actuator system, or any other linear actuator mechanism currently available or developed and operative in accordance with known principles. The location or orientation of Z actuator 130 in X and Y, i.e., relative to the hinge axis 170 (see FIG. 5) of flexural components 160, and thus the torque exerted on the stage, may be adjusted or otherwise selectively modified to optimize performance of the complete design. In some embodiments, Z actuator 130 may be fixedly or rigidly attached, for example to stage frame 150. Alternatively, Z actuator 130 may be fixedly or rigidly attached to X-Y translation table base 110, or Z plate 120. In certain embodiments, Z actuator 130 may be configured to utilize linear slides in a ramp configuration to provide Z translation.

In operation, Z actuator 130 may be operably coupled to, for example, Z plate 120 and employed to provide translation in the Z dimension. Z actuator 130 may be operably coupled to Z plate 120 through kinematic means such as, for example a Z actuator with a spherical actuator tip that slides on a planar surface of Z plate 120; or, alternatively, through a Z actuator tip contacting an X-Y linear slide operably attached to Z plate 120 and moving relative to the Z actuator tip. As best illustrated in FIG. 2, motion in the Z dimension of Z plate 120 on the side proximate to Z actuator 130 may be substantially linear, i.e., parallel to the Z axis; conversely, the distal side of Z plate 120 may be allowed to rotate about hinge axis 170 (see FIG. 5) associated with flexural component 160 situated on the side of Z plate 120 opposite Z actuator 130. Movement in the X dimension may be tolerable for many microscope imaging operations, particularly where total Z translations are expected to be small. As noted above, the total range of Z travel for many microscopy applications is typically expected to be on the order of approximately 1.0 mm, though a microscope stage such as illustrated and described herein may have utility where even greater Z travel is anticipated.

In certain embodiments, flexural component 160 may be characterized by X-Y base coupling 180, Z plate coupling 190, and hinge axis 170. As illustrated in FIGS. 4 and 5, X-Y base coupling 180 may allow flexural component 160 to be rigidly attached to X-Y translation base 110 which is typically fixed in the Z dimension. Similarly, Z plate coupling 190 may allow flexural component 160 to be rigidly or fixedly attached to Z plate 120. During operation, as Z plate 120 is translated by Z actuator 130, flexural component 160 configured and operative as set forth herein may allow Z plate 120 to rotate about hinge axis 170. The distance and orientation of hinge axis 170 relative to X-Y base coupling 180 and Z plate coupling 190 may be selectively adjusted in accordance with overall Z translation requirements, material rigidity, design of Z plate 120, or a combination of the foregoing and other factors. In certain embodiments, hinge axis 170 is positioned in a substantially identical plane as the plane in which the object, specimen, or sample being observed is positioned.

Specifically, it will be appreciated that the configuration and structural elements associated with flexural component 160 are susceptible of numerous variations. Size, shape, material selection, and respective configurations of X-Y base coupling 180 and Z plate coupling 190, for example, may be altered to accommodate stage design and overall system requirements.

An example illustrated in FIGS. 2-5 employs certain embodiments in which flexural component 160 comprises a flexural type hinge, that is to say, a hinge that deflects in response to an actuation force. A suitable flexural hinge may be fabricated of aluminum, steel, titanium, nickel, brass, other metals, and various metal alloys exhibiting suitable hardness, rigidity, heat transfer characteristics, and other properties, or combinations thereof. Metal or metal alloy embodiments may be forged or milled, for example, depending upon the type of material used, the complexity of the shape of the flexural hinge, or a combination of these and other factors. Additionally, or alternatively, various sections or the entirety of the flexural hinge may be fabricated of or incorporate plastics, polymers, or composite materials which may be selected in accordance with strength, rigidity, heat transfer characteristics, and other properties as noted above with respect to metal embodiments. Those of skill in the art will appreciate that material selection and fabrication techniques for a suitable flexural hinge may be application specific, and may depend upon the myriad uses for which the stage, in conjunction with which the flexural hinge may be employed, is intended.

In certain embodiments, flexural hinges may facilitate simpler fabrication and produce hinges with consistent flexural characteristics because the total range of anticipated travel for many microscopy applications is typically expected to be relatively small, typically on the order of approximately 1.0 mm. For greater expected translations in the Z dimension, a robust flexural hinge or a piano hinge assembly may alternately be employed.

In certain embodiments, a flexural component may be embodied by a traditional type hinge. A traditional type hinge, also known as a piano hinge, comprises an axle or pin about which other parts can move relative to one another. A suitable piano hinge may be fabricated of various materials as described above for flexural hinges. Those of skill in the art will appreciate that material selection and fabrication techniques for a suitable piano hinge may be application specific, for example, and may depend upon the myriad uses for which the stage, in conjunction with which the piano hinge may be employed, is intended.

In certain embodiments, flexural component 160 can be integrated into either Z plate 120 or X-Y translation table base 110. In such embodiments, a separate flexural component 160 can be omitted. In place of flexural component 160, hinge axis 170 can be integrated into Z plate 120, X-Y translation table base 110, or both Z plate 120 and X-Y translation table base 110. Integration of hinge axis 170 may be accomplished, for example, through machining Z plate 120, X-Y translation table base 110, or both Z plate 120 and X-Y translation table base 110, in various positions and to varying degree such that Z plate 120, X-Y translation table base 110, or both Z plate 120 and X-Y translation table base 110 typically exhibits predictable flexural characteristics.

One embodiment of a stage design incorporating flexural hinge components as illustrated and described herein was tested in use on a laboratory microscopy system. Primary areas evaluated were Z scanning and point visiting. Results were compared to those obtained using two different traditional type stages. In general, results from the flexural stage testing protocol were at least as good as those obtained using the conventional stages.

In order to minimize test variables, all data were acquired using a 40× water objective in order to provide a large working distance (allowing for large Z scans). All stages were operated using the same linear translation actuator mechanisms with the exception of the Z axis for the flexural stage, which employed a different make and model of actuator mechanism.

Z PSF Tests

Figure 6:
FIGS. 6-8 illustrate point spread function test results (PSF's) in the X-Z plane acquired during 150 µm Z scans taken with 5 µm scan intervals.
Figure 7:
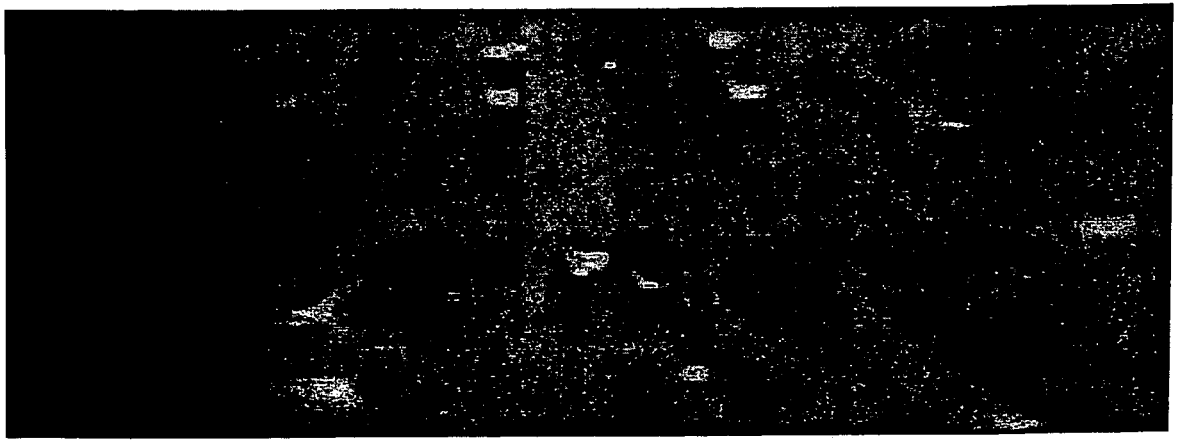
Figure 8:
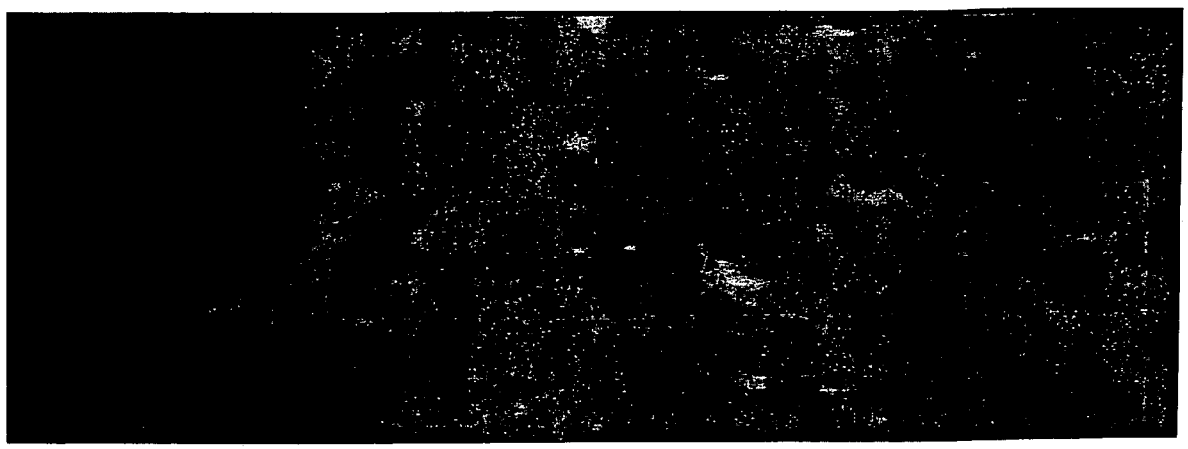

To perform point spread function (PSF) tests, Z scans were taken using bead slides disposed at various positions of the stage's work volume. One aspect of the test sought to determine the possible effects of a flexural stage design on X-Z cross-sectioning. FIGS. 6-8 illustrate PSF's in the X-Z plane acquired during 150 μm Z scans taken with 5 μm scan intervals.

The images in FIGS. 6-8 represent 150 μm Z scans on each stage under test. These scans were taken with 5 μm scan intervals. These types of images may assist in detection of any excessive stage cross-coupling evidenced by exhibition of non-symmetrical images, tilting images, or both. The scans were also used to look for changes in point symmetry throughout the 150 μm travel range, which would indicate varying Z performance. All three stages show similar image symmetry, indicating that Z sectioning performance was similar.

Figure 9:
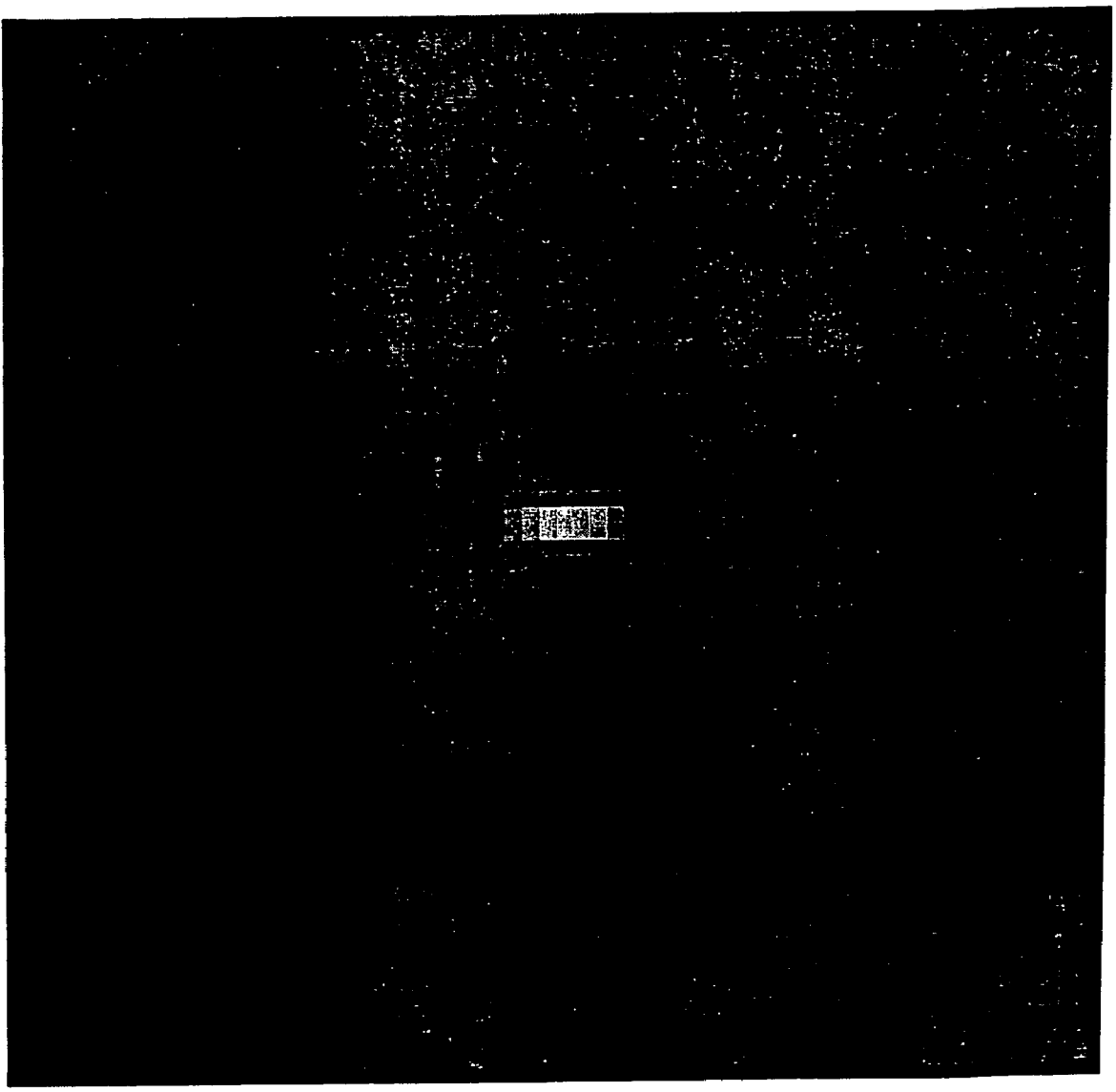
FIGS. 9-11 illustrate PSF's taken on a flexural stage at three points throughout the Z travel range.
Figure 10:
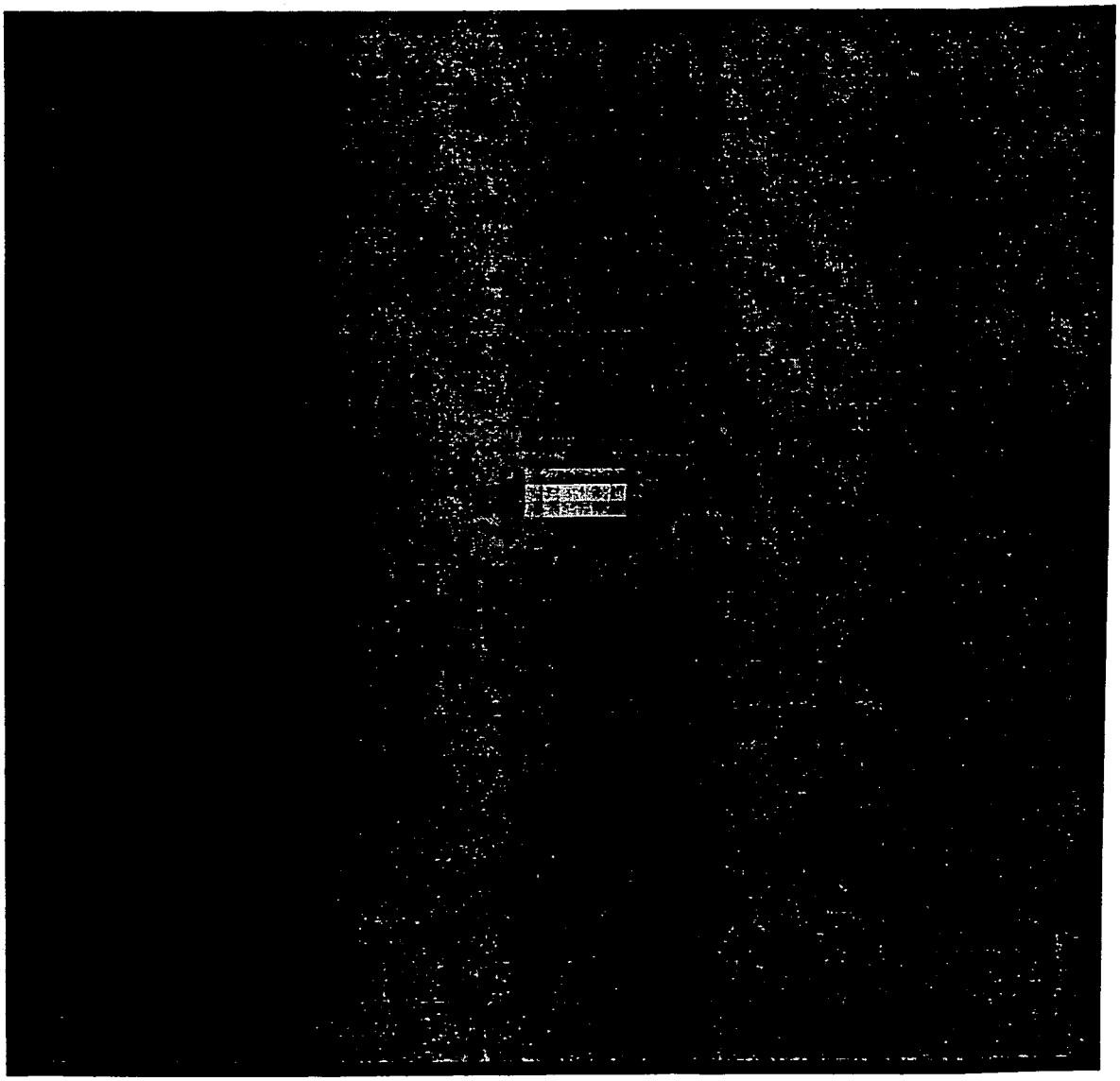
Figure 11:
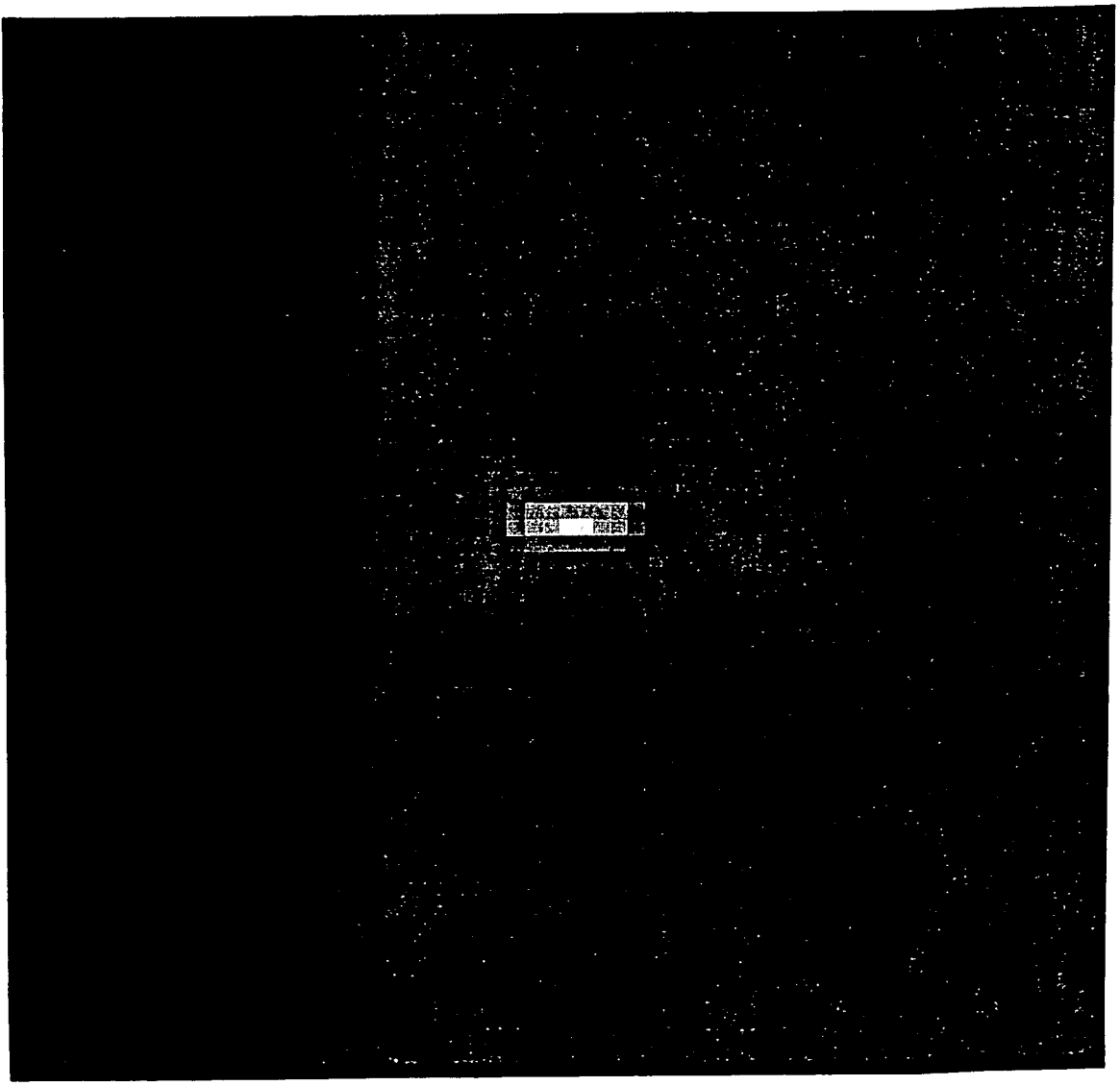

FIGS. 9-11 illustrate PSF's taken on a flexural stage at three points throughout the Z travel range. These scans were the standard 13 μm distance with 0.20 μm scan intervals. Z home position was defined as the Z plate positioned horizontal (or normal to the optical axis). The three nominal scan locations were Z=−200 μm, Z=0 (home), and Z=+200 μm. This covered a Z range of 400 μm, which represents the prototype flexural stage design's capabilities. These scans were also used to look for irregularities in Z sectioning throughout the Z travel envelope. All three beads were scanned at approximately the same optical depth. X and Y positions also changed for each point, however due to limitations of the prototype design, travel was limited to an approximate 8 mm square area. This area did include end of travel conditions for the X axis slides, which created a minimum stiffness (worst case) scenario for Z stability. All three points show expected symmetry, indicating that the X-Z cross-coupling had no appreciable effect on data quality.

As part of the testing Y-Z images PSF's were also created. These looked similar to the X-Z images.

X-Y-Z Point Visiting Tests

This series of tests was performed to validate stage repeatability during a typical point visiting experiment. The experiment consisted of a three point scan, with each point being visited ten times. As each point was visited, a Z scan was also performed. The total X-Y stage movement for each scan sequence was approximately 4 mm.

Additional point visiting tests were also run on a flexural stage as illustrated and described above with reference to FIGS. 1-5 that included a larger number of point per sequence (up to ten), and experiments that also took 13 μm Z sections at each point visited. In general, X-Y repeatability error did not exceed 0.35 μm for all points collected at a given X-Y location. This error value included possible effects from thermal drift and "noisy" environment.

The present invention has been illustrated and described in detail with reference to particular embodiments by way of example only, and not by way of limitation. Those of skill in the art will appreciate that various modifications to the exemplary embodiments are within the scope and contemplation of the present disclosure. Accordingly, other embodiments are within the scope of the following claims.

What is claimed is:

1. A stage comprising:
   a plate disposed substantially orthogonal to an optical axis;
   an actuator operably coupled to a proximal side of said plate and operative to translate said proximal side in a direction substantially parallel to said optical axis; and
   a flexural component operably coupled to a distal side of said plate and operative to allow rotation of said plate about a hinge axis.

2. The stage of claim 1 wherein said hinge axis is positioned in substantially the same plane as an object viewed through said optical axis.

3. The stage of claim 1 wherein said flexural component comprises a flexural hinge.

4. The stage of claim 3 wherein said flexural hinge comprises:
   a first coupling allowing said flexural hinge to be rigidly attached to said plate; and
   a second coupling allowing said flexural hinge to be attached to a structure fixed at a predetermined location along the optical axis.

5. The stage of claim 3 wherein said flexural hinge comprises of one or more materials selected from a group of materials comprising of metal, metal alloy, plastic, composites, or polymers.

6. The stage of claim 1 wherein said hinge component comprises a piano hinge.

7. The stage of claim 6 wherein said piano hinge comprises:
   a first coupling allowing said piano hinge to be rigidly attached to said plate; and
   a second coupling allowing said piano hinge to be attached to a structure fixed at a predetermined location along the optical axis.

8. The stage of claim 6 wherein said piano hinge comprises of one or more materials selected from a group of materials comprising of metal, metal alloy, plastic, composites, or polymers.

9. The stage of claim 1 wherein said actuator comprises a lead screw device.

10. The stage of claim 1 wherein said actuator comprises a piezoelectric actuator.

11. The stage of claim 1 wherein said actuator comprises a bellows coupling driven actuator.

12. The stage of claim 1 wherein said actuator is coupled to a stage frame.

13. The stage of claim 1 wherein said actuator is operably coupled to said plate through linear slides.

14. The stage of claim 1 wherein said actuator is operably coupled to said plate through kinematic means.

15. A stage comprising:
   a plate disposed substantially orthogonal to an optical axis comprising a distal flexural section operative to allow rotation of said plate about a hinge axis, and;
   an actuator operably coupled to a proximal side of said plate and operative to translate said proximal side in a direction substantially parallel to the optical axis.

16. A method of providing movement of a stage; said method comprising:
   providing a plate disposed substantially orthogonal to an optical axis;
   translating a proximal side of said plate in a direction substantially parallel to said optical axis; and
   allowing said plate to rotate about a hinge axis.

17. The method of claim 16 wherein said translating comprises coupling an actuator to said proximal side of said plate.

18. The method of claim 17 further comprising selectively adjusting a location of the actuator relative to said hinge axis.

19. The method of claim 17 wherein said translating further comprises utilizing a linear actuator mechanism.

20. The method of claim 16 wherein said providing comprises coupling said plate to a flexural component.

21. The method of claim 16 wherein said providing comprises coupling said plate to a piano hinge.

22. The method of claim 16 wherein said providing comprises integrating said hinge axis into said plate.

23. The method of claim 16 wherein said providing comprises positioning said hinge axis in substantially the same plane as the object observed through said optical axis.

24. The stage of claim 15, wherein said hinge axis is defined by said flexural section.

25. The stage of claim 15, wherein translation of said proximal side by said actuator changes the relative separation of said proximal side and said distal sides along said optical axis.

26. The stage of claim 15, wherein said flexural section includes a piano hinge comprising:
    a first coupling allowing said piano hinge to be rigidly attached to said plate; and
    a second coupling allowing said piano hinge to be attached to a structure fixed at a predetermined location along the optical axis.

27. The stage of claim 26 wherein said actuator causes said proximal side of said plate to be translated relative to a distal side of said plate in a direction substantially parallel to the optical axis.

* * * * *